June 7, 1927.  
S. CARNES  
1,631,915  
VEHICLE BODY REMOVING AND REPLACING DEVICE  
Filed Oct. 2, 1926   2 Sheets-Sheet 1
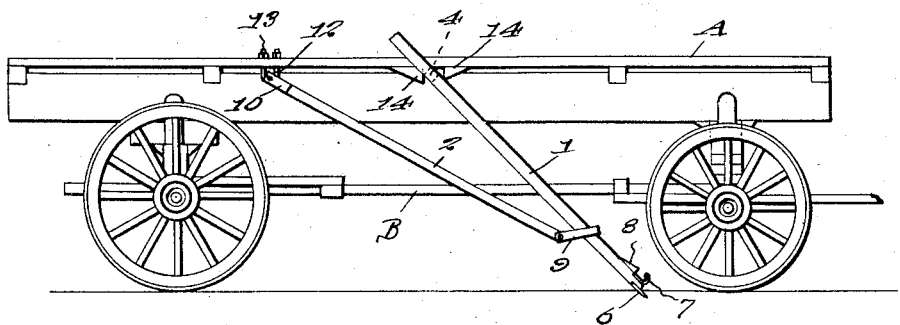
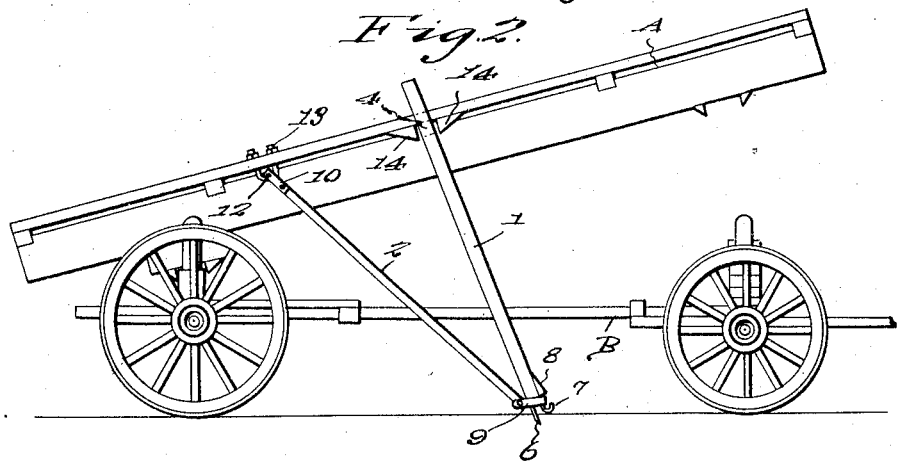
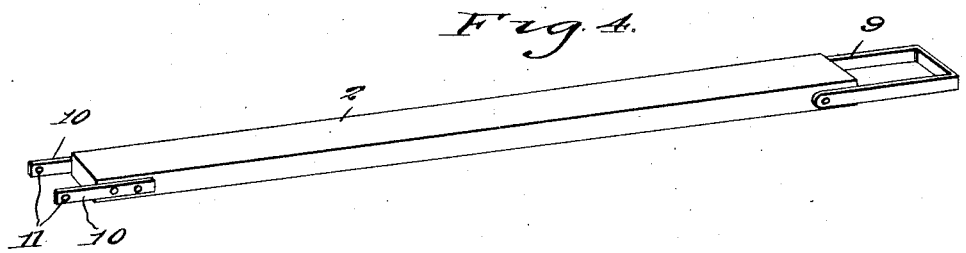
S. Carnes INVENTOR June 7, 1927.
S. CARNES
1,631,915
VEHICLE BODY REMOVING AND REPLACING DEVICE
Filed Oct. 2, 1926     2 Sheets-Sheet 2
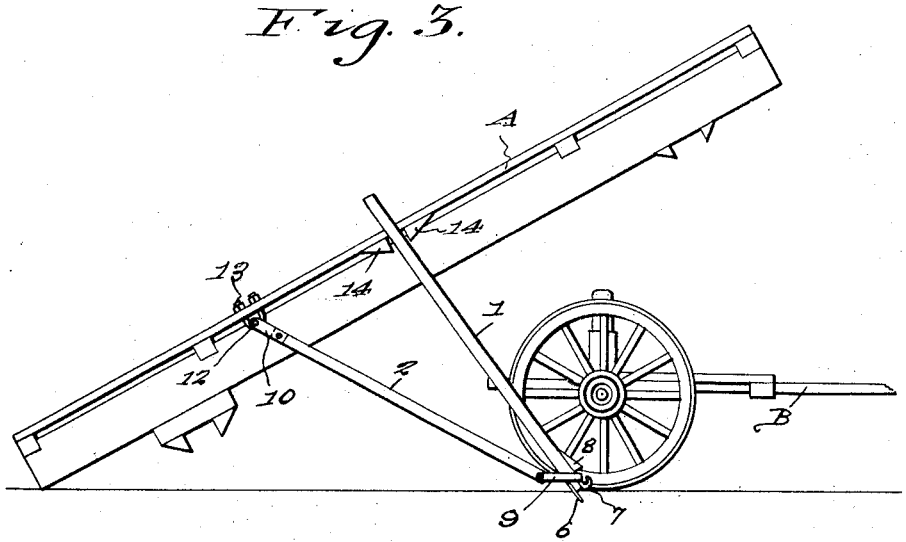
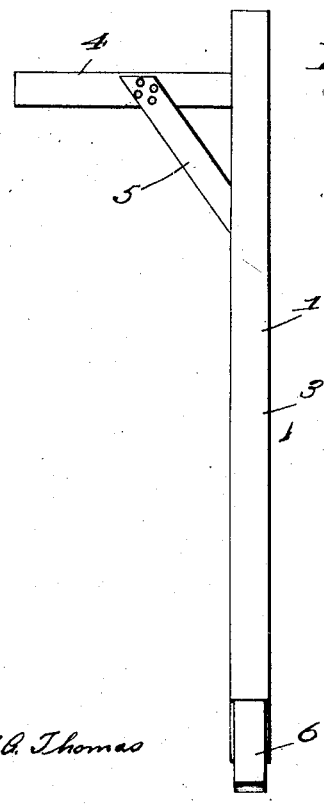
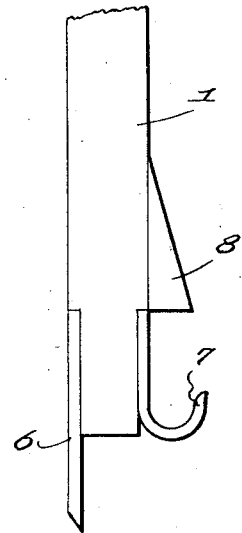
WITNESS:   R. C. Thomas
S. Carnes INVENTOR
BY Victor J. Evans ATTORNEY Patented June 7, 1927.

1,631,915

UNITED STATES PATENT OFFICE.

SAM CARNES, OF NORTH POWDER, OREGON.

VEHICLE BODY REMOVING AND REPLACING DEVICE.

Application filed October 2, 1926. Serial No. 139,156.

This invention relates to a device for unloading wagon bodies, hay racks, etc, from the running gears of wagons and the like and for replacing them on the running gears, the general object of the invention being to provide a pair of members placed one at each side of the wagon and resting upon the ground and engaging the body so that when the running gear is pulled forwardly, the rack or body is raised and slid over the rear bolster, the members holding the body or rack in a tilted position with one end resting upon the ground so that the running gear can be backed under the same and the rack or body replaced by tilting it on the members.

This invention also consists in certain other features of construction and in the combination and arrangement of the several parts, to be hereinafter fully described, illustrated in the accompanying drawings and specifically pointed out in the appended claims.

In describing my invention in detail, reference will be had to the accompanying drawings wherein like characters denote like or corresponding parts throughout the several views, and in which:—

Figure 1 is a side view of a wagon, showing the device attached thereto ready to remove the body from the running gear.

Figure 2 is a similar view, showing the body held in raised position by the device.

Figure 3 is a view showing the body entirely removed from the running gear.

Figure 4 is a view of one of the sliding beams.

Figure 5 is a view of one of the knee members.

Figure 6 is a fragmentary view of the lower portion of one of these members.

In these views, 1 indicates the knee member and 2 the sliding beam. The member 1 is composed of a beam 3 having a horizontally arranged arm 4 attached thereto adjacent its upper end, the arm being braced, as shown at 5. I prefer to provide the beam 3 with a number of holes for receiving the bolts which connect the brace and arm thereto so that the arm can be adjusted on the beam. The lower end of the beam 3 has fastened thereto a bar 6 of metal which extends beyond the end of the beam and has its ends beveled so that it will penetrate the surface upon which the wagon rests. This end of the beam is also provided with a hook-shaped plate 7 and a wedge-shaped block 8 is fastened to this end of the beam immediately above the plate 7, the hook-shaped part of the plate and the block forming a recess. The sliding beam 2 has a yoke 9 pivoted to its lower end which is adapted to fit in this recess so that it has limited movement between the block and the hook of the plate. The upper end of the beam 2 has a strip 10 fastened to each edge thereof, with the projecting part of the strip formed with a hole 11 so that a pin 12 or bolt can be passed through the holes in the strips. A U-shaped bolt 13 is fastened to each side of the wagon box or rack A a distance from the center thereof and a pair of blocks 14 is fastened to each side of the body or rack substantially at the center, said blöcks being spaced apart to receive the arm 4 of each member 1.

When the body or rack is to be removed from the running gear B, an arm of each device is placed in the space between each pair of blocks 14 and the pin 12 of each device is passed through the U-bolt 13 and then through the perforation or hole 11 in the inner strip 10. This connects the device with the body and the parts are then in the position shown in Figure 1. The wagon is then drawn forwardly, which will force the plate 6 into the ground and then further movement of the two devices is prevented so that further movement of the wagon will tend to rock the devices until they assume a position nearly vertical and this action of the devices will cause the body to tilt upwardly on the rear bolster of the wagon, as shown in Figure 2. Then a further movement of the wagon will cause the beams 2 to raise the lower part of the body until it clears the rear bolster and then the body will slide downwardly until its rear end engages the ground. The running gear can then be pulled from under the body, as shown in Figure 3.

When the body is to be replaced, it is simply necessary to back the gear between the devices and then lift the rear of the body so that it will rock on the devices until the rear part engages the rear bolster. Then the pins 12 are removed and the wagon backed until the body comes to rest on the front bolster.

Thus it will be seen that I have provided a simple arrangement for removing wagon bodies from the running gear and replacing them on the gear, the operation requiring but slight effort on the part of the operator.

It is thought from the foregoing description that the advantages and novel features of my invention will be readily apparent.

I desire it to be understood that I may make changes in the construction and in the combination and arrangement of the several parts, provided that such changes fall within the scope of the appended claims.

What I claim is:—

1. A device of the class described comprising a beam, an arm extended at rightangles therefrom adjacent the top thereof, a ground engaging part at the lower end of the beam, a second beam slidably connected with the first beam, means for holding the second beam adjacent the lower end of the first beam and means for detachably connecting the upper end of the second beam with a wagon body, the arm of the first beam also engaging a part of the wagon body.

2. A device of the class described comprising a beam, an arm extending at rightangles from the beam adjacent the top thereof, a ground engaging element at the lower end of the beam, a hook-shaped member at the lower end of the beam, a wedge-shaped block connected with the beam above the hook-shaped member and forming with the hook thereof a space, a second beam, a yoke pivotally connected with the second beam, and slidably arranged on the first beam with its bight adapted to enter the space and means for connecting the arm and the upper end of the second beam with the wagon body.

3. A device of the class described comprising a beam, an arm extending at rightangles from the beam adjacent the top thereof, a ground engaging element at the lower end of the beam, a hook-shaped member at the lower end of the beam, a wedge-shaped block connected with the beam above the hook-shaped member and forming with the hook thereof a space, a second beam, a yoke pivotally connected with the second beam, and slidably arranged on the first beam with its bight adapted to enter the space, means for connecting the arm and the upper end of the second beam with the wagon body, such means comprising a pair of blocks on each side of the wagon body for receiving the arm between them and a U-shaped bolt on the wagon body for receiving a part at the upper end of the second beam.

In testimony whereof I affix my signature.

SAM CARNES.